United States Patent [19]

Karikas

[11] 4,267,943

[45] May 19, 1981

[54] METHOD AND APPARATUS FOR HANDLING AND DISPENSING HYGROSCOPIC PELLETS

[75] Inventor: John J. Karikas, Shelby, Ohio

[73] Assignee: General Electric Company, Schenectady, N.Y.

[21] Appl. No.: 40,233

[22] Filed: May 18, 1979

[51] Int. Cl.³ .................. B65B 31/02; B67C 3/10; G01F 11/24

[52] U.S. Cl. .................. 222/1; 141/311 R; 141/352; 222/152; 222/325

[58] Field of Search .................. 222/1, 53, 152, 190, 222/325, 636; 141/69, 311 R, 351, 352, 392; 406/197

[56] References Cited

U.S. PATENT DOCUMENTS

| | | | |
|---|---|---|---|
| 3,018,021 | 1/1962 | Gorand et al. | 222/152 |
| 3,676,534 | 7/1972 | Anderson | 264/9 |
| 3,880,179 | 4/1975 | Lenz et al. | 222/1 X |
| 4,151,933 | 5/1979 | Myers | 222/325 X |

Primary Examiner—F. J. Bartuska
Attorney, Agent, or Firm—Ernest W. Legree; Lawrence R. Kempton; Philip L. Schlamp

[57] ABSTRACT

A system for handling hygroscopic metal halide pellets serving as fill material in high pressure metal halide lamps. The pellets are loaded into stoppered transport vials at their place of manufacture. At the place of utilization, the stoppered end of the vial is inserted into a self-sealing opening in a reservoir through which dry gas is flushed to remove any contaminants. The vial is then unstoppered without removing it from the opening and its contents spill out into the reservoir. A transfer device accommodating a set number of pellets is brought into conjunction with an outlet opening, the device is filled, and the pellets transported to their destination through a channel filled with dry gas.

9 Claims, 6 Drawing Figures

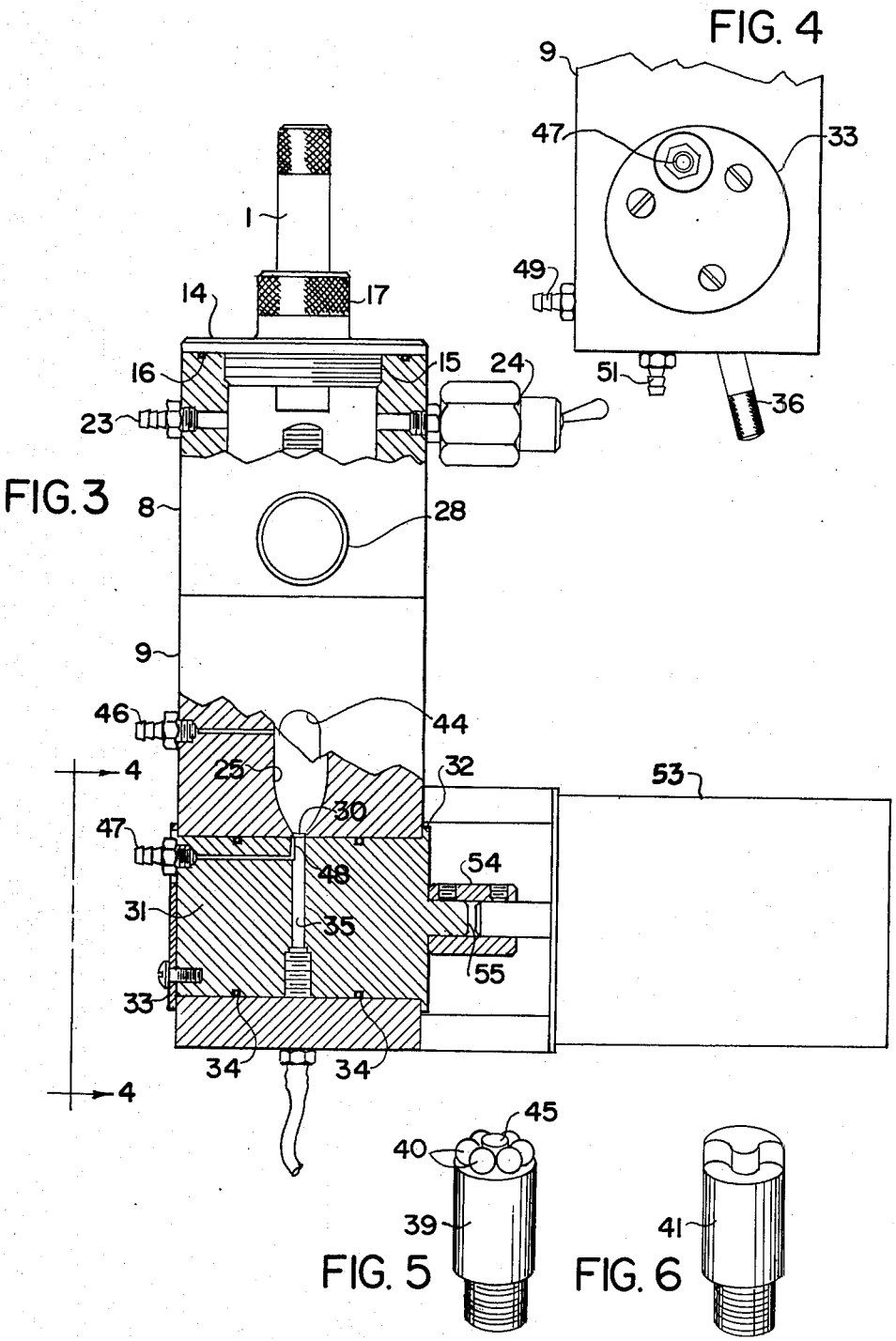

METHOD AND APPARATUS FOR HANDLING AND DISPENSING HYGROSCOPIC PELLETS

The invention relates to a system for handling and mechanism for dispensing fluent material which is readily contaminated such as hygroscopic metal halide pellets serving as fill material in high pressure metal halide discharge lamps. The mechanism is particularly adapted to use with high speed lamp manufacturing apparatus wherein lamp bodies are indexed to a station at a rate of several hundred per hour and each is required to be supplied with a set number of pellets.

BACKGROUND OF THE INVENTION

In the manufacture of metal halide lamps, dispensing the required quantity of metal halide salt into the lamp envelope is technically difficult because the salts are highly hygroscopic and the inclusion of water vapor or hydrogen or oxygen in any form within the lamp envelope is highly detrimental. Oxygen present within the envelope may oxidize metals such as tungsten which make up the lamp electrodes, and the resulting metal oxide condenses on the envelope wall and reduces light transmission. When hydrogen is also present, a cyclic action may take place wherein the hydrogen reduces metal oxide on the wall back to metal, freeing the oxygen to attack other electrode metal. This action results in rapid erosion of the electrodes and darkening of the walls to the point where useful life is terminated. In order to forestall or alleviate the foregoing possibilities, highly purified materials must be used for the fill, for instance metal halide salts wherein impurities such as hydrogen or oxygen are held down to a few parts per million, for instance less than 20 parts per million (ppm). In addition, since the metal halides used are highly hygroscopic, it is necessary to handle them in such fashion as to prevent the absorption of moisture or impurities from the atmosphere.

In U.S. Pat. No. 3,676,534—Anderson, "Process Relating to Ultrapure Metal Halide Particles", 1972, there is described a vacuum shot tower technique for preparing purified metal halide salts for use in lamp making, as spheroidal pellets of controlled size. Such pellets can be purchased from Anderson Physics Laboratories, Inc. of Champaign, Illinois and have been successfully used in lamp making. In order to protect the pellets against atmospheric contamination, the practice has been to ship them in sealed glass vials containing several thousand. At the lamp factory, the vial must be broken open in a dry box and the requisite number of pellets manually loaded into lamp bodies by an operator. Such manual handling of the pellets is slow and uneconomical and the operator can easily make an error in the number of pellets loaded into a lamp. Also the risk of contamination through mishap in the dry box, or failure of equipment such as accidental tearing of the hand and arm sheaths of the dry box operator, is ever present. If there is an error in the number of pellets loaded or if the pellets should absorb moisture, lumen output and color may vary from lamp to lamp and efficacy is lowered.

SUMMARY OF THE INVENTION

The object of the invention is to provide a contamination-proof method for handling metal halide dosing pellets in electric lamp manufacture comprising a convenient means for transporting the pellets from the point of manufacture to a lamp factory, and a mechanism adapted to work in cooperation with a lamp manufacturing machine for dispensing the requisite number of pellets to a lamp body.

In the method according to my invention, the fluent material or pellets are loaded at their place of manufacture into special stoppered transport vials wherein they are protected from the atmosphere. At the place of lamp manufacture where the pellets are to be utilized I provide a reservoir having an inlet opening through which the stoppered end of a vial can be inserted and which becomes sealed thereby. The reservoir also has an outlet opening. The filled vials are transported to the place of utilization, one is inserted into the inlet opening and dry non-reactive gas is flushed through the reservoir to remove any moisture or contaminants. The vial is then unstoppered without removing it from the opening and its contents spill out into the reservoir. A transfer device accommodating a given volume of fluent material or a set number of pellets is brought into conjunction with the outlet opening, the device is filled and the pellets are transported to their destination, preferably through a channel filled with the dry gas.

A mechanism embodying my invention for dispensing the hygroscopic pellets comprises a housing defining a reservoir having the aforementioned inlet and outlet openings. Preferably the housing comprises one closed portion forming a loading chamber which has the inlet opening, another closed portion forming a dispensing chamber which has an outlet opening, and a passage interconnecting the chambers. A valve is provided to close the passage and it is opened to release the pellet charge from the loading chamber into the dispensing chamber. The valve is opened only after contaminants have been flushed out of the loading chamber and it is reclosed prior to removing an empty vial. By so doing, vials may be replaced without contaminating the charge in the dispensing chamber and without interrupting the operation of a transfer device.

The transfer device comprises metering means adjustable to determine a volume accommodating a given number of pellets. The metering means is oscillated in a closed path between conjunction with the outlet opening from the dispensing chamber, and conjunction with an inlet opening into a delivery channel. Thus the metering means is filled with a given number of pellets and releases them into the delivery channel at each oscillation. In an automated system the oscillations are synchronized to the index of lamp bodies into a pellet loading station.

DESCRIPTION OF DRAWINGS

FIG. 3 is a side partly sectional elevation through the dispensing mechanism.

FIG. 4 is a front elevation of the lower part of the dispensing mechanism.

FIG. 5 is an enlarged pictorial view of the metering rod tip.

FIG. 6 is a view similar to FIG. 5 of an alternative metering rod tip.

DESCRIPTION OF PREFERRED EMBODIMENT

Figure 1:
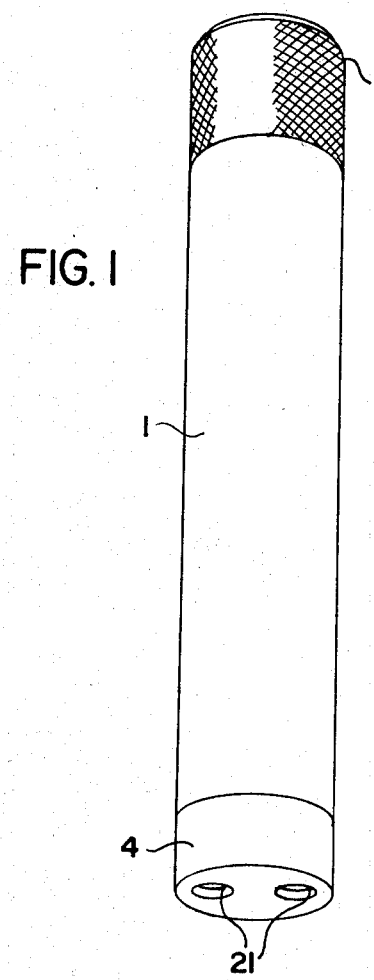
FIG. 1 is an enlarged pictorial view of a transport vial.
Figure 2:
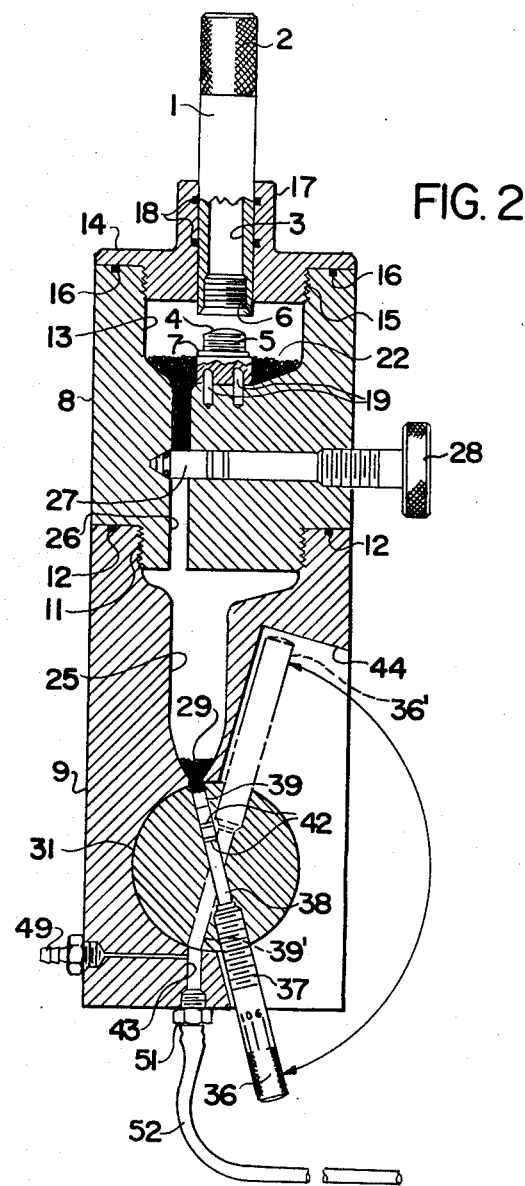
FIG. 2 is a front sectional elevation through the dispensing mechanism.

The specially sealed transport vial 1 in which the fluent material in the form of metal halide pellets are shipped from the point of manufacture is shown in a pictorial view in FIG. 1 and it appears partly sectioned in FIG. 2. It may be made of polished stainless steel with a knurled end 2 to facilitate handling. It is accurately machined as a hollow cylinder and by way of example, the outer diameter may be one-half and the overall length with cap slightly under three inches. With these dimensions the volume of the internal cavity 3 would be approximately 2.5 cm$^3$ and the vial would accommodate several thousand metal iodide pellets of 1 millimeter diameter. The cap 4 is machine-threaded at 5 and screws smoothly into the threaded end 6 of the vial. The seal between the vial and the cap is effected by an O-ring sealing washer 7 which is retained on the cap in an undercut below the threads. When the cap is screwed on, the vial and cap present a smooth unbroken cylindrical surface from end to end except for the knurling at 2.

The overall dispensing mechanism, shown in FIGS. 2 and 3, comprises a housing defining a reservoir and made up of two principal structural parts, the upper loading chamber housing 8 and the lower dispensing chamber housing 9. The upper housing screws down into the lower one at 11, and a hermetic seal is effected between the two parts by an O-ring 12. The upper housing contains a cavity 13 of a size adequate to accommodate the entire metal halide pellet contents of one vial when emptied into it. The upper housing is closed by a cover 14 which screws into it by cooperating threads at 15, the hermetic seal being made by an O-ring washer 16. The cover 14 has an inlet opening through the central portion 17 which forms a self-sealing collar for accommodating the transport vial 1. A pair of O-ring sealing washers 18 within the collar engage the outer surface of the vial and make a hermetic seal to it.

In order to unstopper a vial without unsealing the inlet opening, interpenetrable locking portions are provided in the loading chamber and in the stopper. As illustrated, protuberances in the form of a pair of dowel pins 19 are mounted in the bottom face of cavity 13 immediately below the aperture through collar 17 for engaging cavities in the form of a pair of mating holes 21 in the cap of the transport vial. To charge the loading chamber, a capped vial 1 is inserted into the collar 17 and pushed home while swivelling back and forth if necessary until cap 4 engages the dowel pins. Dry gas is flushed through the chamber to remove contaminants that may have entered and also to vaporize and remove any adhering to the external surfaces of the vial, before the cap is unscrewed. The vial is then turned counter-clockwise until the cap is released and is drawn up in the collar to provide enough clearance to allow the pellets to tumble out into the bottom of the loading chamber as shown at 22.

A gentle flow of a dry nonreactive gas is maintained at all times through the loading chamber to protect the pellets from atmospheric contamination. The inert gas argon is preferred for this purpose because it is also used as the fill starting gas in the metal halide discharge lamps for which the pellets are destined. The argon is introduced through inlet fitting 23 shown in FIG. 3, and a vent valve 24 has two positions determining a low or a high rate of flushing. The high flush rate is maintained while vials are being exchanged, and for an interval after the insertion of a fresh vial long enough to thoroughly dry its external surface and flush out any moisture or contaminants.

A vial is kept in the collar at all times while the argon flush is at the low rate and this maintains the loading chamber sealed off from the atmosphere. Prior to replacing a vial, it is pushed down and the cap screwed back on. The argon flush is then switched to the high rate, the vial pulled out, and a fresh one inserted. The caps are unscrewed from the vials only in the dry argon atomsphere of the loading chamber in order to protect not only the contents but also the interior of the vials from contamination.

The loading chamber 13 communicates with the dispensing chamber 25 in the lower housing 9 through a vertical passage 26. The distal end of a needle valve 27 projects into the passage 26, blocking it and sealing off the loading chamber from the dispensing chamber. To recharge the dispensing chamber, the needle valve is screwed out manually using the knurled knob 28. The metal halide pellets drop through the passage 26 and come to rest in the bottom of the dispensing chamber as indicated at 29. The dispensing chamber tapers down into a restricted outlet opening 30 where a transfer device will remove a given number of pellets at a time.

The transfer device comprises an oscillating drum 31 located in a cylindrical cavity within the lower housing immediately below the dispensing chamber. The drum is retained within the housing by a shoulder 32 on the backside and a circular plate 33 fastened to the front side, the shoulder and the plate overlapping the edges of the cavity. The drum is hermetically sealed within the cavity by O-ring sealing washers 34. A diametral passage 35 extends through the drum and a metering rod is located in it. The metering rod comprises a portion 36 knurled for convenience in grasping, a threaded portion 37, and a more slender portion 38 to whose end is screwed on a tip insert such as that shown at 39 in FIG. 5 or at 41 in FIG. 6. A pair of O-ring sealing washers 42 around the slender portion 38 prevent leakage of the argon flushing gas past that point.

The cylindrical cavity in which the drum is located is intersected by outlet opening 30 of the dispensing chamber and by delivery channel 43 along the arcuate path described by the end of diametral passage 35. The sector of the cylindrical cavity between opening 30 and channel 43 in the functional portion. The drum can be rocked between two limits while the outer projection portion 36 of the metering rod swings through the slot 44 in the right hand side of the lower housing to position 36'. At one (upper) limit, the end of the diametral passage and tip 39 of the metering rod shown in solid lines is in conjunction with the outlet opening 30. At the other (lower) limit the tip 39' shown in phantom lines is in conjunction with the delivery channel 43 in the lower housing. At the upper conjunction pellets enter the cavity as determined by the choice of tip insert and the adjustment of the metering rod 38 in the drum. The number of pellets accommodated will depend upon the shape of the tip or face of the insert and its proximity to the wall of the cylindrical cavity in which drum 31 is housed, that is upon the extent to which the metering rod is screwed in or out. For instance, choosing tip 39 and adjusting the metering rod so that the raised central boss 45, which is approximately equal in diameter and height to a pellet diameter, is flush with the cavity wall, six pellets 40 would be accommodated in a ring around the boss as shown in FIG. 5. With a similar adjustment of tip 41 shown in FIG. 6, four pellets would be accommodated. By removing the boss from the tip in FIG. 5, seven pellets would be accommodated. For feeding yet larger numbers of pellets at every stroke, the metering rod can be screwed out and the pellets allowed to enter the end and settle in two or more layers.

Referring to FIG. 3, inlet fitting 46 receives dry argon gas for flushing through dispensing chamber 25. Inlet fitting 47 which projects through end plate 33 of the drum, communicates with a narrow V-shaped passage 48 extending along one side of the aperture for the metering rod in the region of the tip insert. Argon at low pressure through this passage provides a tiny jet by the face of the tip insert which causes the pellets to dance and skate about. Such movement assures uniform loading of pellets on the face of the insert at every stroke.

Inlet fitting 49, seen in FIGS. 2 and 4, communicates with delivery channel 43 into which the pellets drop at the lower conjunction. At normal times, a gentle flow of dry argon is provided for purging purposes. Immediately after the pellet drop, a puff of argon gas is supplied which blows the pellets through channel 43, outlet fitting 51 and delivery tube 52 towards its ultimate destination which is a lamp body.

Drum 31 and metering rod 38 which it carries may be rocked or oscillated by hand. However for association with a high speed lamp making machine, an automated arrangement is desirable. This may conveniently be effected through a slow speed synchronous steeping motor, for instance one requiring seven pulses per degree, shown at 53 in FIG. 3. The set screw collar 54 couples the motor shaft to stub shaft 55 of drum 31 so that the two are driven in unison. The motor thus rocks the metering rod back and forth between the two conjunctions, and the preset number of pellets are dropped into the delivery tube at every cycle and blown to the lamp body charging point. The pellets are thus at all times shielded and remain free of contamination from the atmosphere or contamination produced by manual handling.

What I claim as new and desire to secure by Letters Patent of the United States is:

1. A method of handling readily contaminated fluent material comprising:

providing a transport vial having a hermetically stopperable end and loading said material at manufacture immediately into the vial and stoppering same, providing at the place of utilization of said material a reservoir comprising a loading chamber and a dispensing chamber with a normally closed passage interconnecting them, said loading chamber having an inlet opening through which the stoppered end of the vial can be inserted and which becomes sealed upon insertion of the vial therein to, and said dispensing chamber having an outlet opening, transporting the charged vial to said place and inserting it into said inlet opening, then flushing contaminants out of said loading chamber and thereafter unstoppering the vial without removing it from said inlet opening and discharging its contents into said loading chamber, opening said passage in order to transfer the charge to the dispensing chamber, removing from the dispensing chamber a given quantity of said material at a time by periodically bringing into conjunction with the outlet opening a transfer device accommodating said quantity, and subsequently closing said passage before removing the empty vial from the inlet opening in the loading chamber in order to prevent contamination of the dispensing chamber.

2. A method of handling hygroscopic lamp fill material which has been formed into pellets comprising:

providing a transport vial having a hermetically stopperable end and loading said pellets at manufacture immediately into the vial and stoppering same, providing at the place of utilization of said material a reservoir comprising a loading chamber and a dispensing chamber with a normally closed passage interconnecting them, said loading chamber having an inlet opening through which the stoppered end of the vial can be inserted and which becomes sealed upon insertion of the vial thereinto, and said dispensing chamber having an outlet opening, transporting the charged vial to said place and inserting it into said inlet opening, then flushing dry non-reactive gas through said reservoir to remove contaminants from said loading chamber and thereafter unstoppering the vial without removing it from said inlet opening and discharging its contents into said loading chamber, opening said passage in order to transfer the charge received from the vial into the dispensing chamber, providing a transfer device accommodating a set number of pellets, bringing the device into conjunction with the outlet opening in order to fill it, and then transporting said set number of pellets to their destination, and subsequently closing said passage before removing the empty vial from the inlet opening in the loading chamber in order to prevent contamination of the dispensing chamber.

3. A method as defined in claim 2 including the additional steps of providing a delivery channel through which dry non-reactive gas is flushed, said channel having an inlet opening, and bringing the transfer device filled with said set number of pellets into conjunction with the inlet opening of said delivery channel and releasing the pellets thereinto for transport to their destination.

4. A mechanism for receiving and dispensing readily contaminated fluent material comprising:

a reservoir including a closed portion forming a loading chamber having an inlet opening, another closed portion forming a dispensing chamber having an oulet opening, and a passage interconnecting the chambers together with a valve normally closing the passage which can be opened to release the charge of fluent material from the loading chamber into the dispensing chamber, said inlet opening being adapted to accommodate and be sealed by the insertion of a vial thereinto containing a charge of said material and having a stoppered end adapted to enter said loading chamber, means for flushing contaminants out of said loading chamber, means for unstoppering said vial without unsealing said inlet opening in order to discharge its contents into the loading chamber without contaminating it, and a transfer device comprising metering means defining a given volume and means to oscillate said metering means in a closed path between said outlet opening and a delivery channel in order to transfer a set quantity of said material from said dispensing chamber to the delivery channel at every oscillation.

5. A mechanism as defined in claim 4 wherein said transfer device comprises, a rotatable member fitting in a sector of a cylindrical cavity and having a diametral passage extending therethrough, and a metering rod in said passage having a tip adjustable in proximity to the cavity wall to determine the volume accommodating a set quantity of said material, said cylindrical sector being intersected by said outlet opening and by said delivery channel along the arcuate path described by the end of said passage, and means to rock said member whereby to oscillate the end of said passage between conjunction with said outlet opening and conjunction with said delivery channel.

6. A mechanism for receiving and dispensing hygroscopic lamp fill material which has been formed into pellets of substantially uniform size comprising:

a housing defining a reservoir comprising a loading chamber having an inlet opening, a dispensing chamber having an outlet opening, and a passage interconnecting said chambers together with a valve for opening or closing the passage, said inlet opening being adapted to accommodate and be sealed by the insertion of a vial thereinto, said vial being adapted to contain a charge of said pellets and having a stoppered end adapted to enter said loading chamber, means for flushing dry non-reactive gas through said reservoir, means for unstoppering said vial without unsealing said inlet opening, and a transfer device comprising metering means defining a volume accommodating a given number of pellets and means to oscillate said metering means in a closed path between said outlet opening and a delivery channel in order to transfer said given number of pellets from the dispensing chamber to the delivery channel at every oscillation.

7. A mechanism as defined in claim 6 wherein said transfer device comprises, a drum-like member fitting in a cylindrical cavity and rotatable therein, a diametral passage extending through said member, and a metering rod in said passage having a tip adjustable in proximity to the cavity wall, said passage and the adjustment of said tip near the end of said passage determining the volume accommodating a given number of pellets, said cylindrical cavity being intersected by said outlet opening and by said delivery channel along the arcuate path described by the end of said passage, and means to rock said member whereby to oscillate the end of said passage between conjunction with said outlet opening and conjunction with said delivery channel.

8. A mechanism as defined in claim 6 adapted to accommodate a vial which is substantially cylindrical in external configuration and can slide in or out of said inlet opening and also rotate in said inlet opening while yet sealing it and which has a screwed-in stopper, and wherein the means for unstoppering said vial without unsealing said inlet opening comprise interpenetrable parts in the stopper and in the housing which become engaged by pushing the vial into said inlet opening whereby the stopper may be unscrewed and removed by rotating the vial and partially withdrawing it.

9. A mechanism as defined in claim 8 wherein said interpenetrable parts comprise cavities in the stopper and cooperating mating bosses in the housing which are engaged when the vial is pushed home into the inlet opening.

* * * * *